United States Patent [19]
Van Eldik et al.

[11] Patent Number: 6,040,839
[45] Date of Patent: Mar. 21, 2000

[54] REFERENCING SYSTEM AND METHOD FOR THREE-DIMENSIONAL OBJECTS DISPLAYED ON A COMPUTER GENERATED DISPLAY

[76] Inventors: Benjamin J. Van Eldik, 16 Mattingley Court; Martin Coffey, 22 Mattingley Court, both of Banks ACT 2906, Australia

[21] Appl. No.: 08/792,502

[22] Filed: Jan. 31, 1997

[51] Int. Cl.$^7$ .................................................. G06T 17/40
[52] U.S. Cl. ........................ 345/433; 345/433; 345/420; 345/145; 345/474
[58] Field of Search ...................................... 345/440, 430, 345/419, 156, 433; 395/155, 133

[56] References Cited

U.S. PATENT DOCUMENTS

| | | | |
|---|---|---|---|
| 4,677,576 | 6/1987 | Berlin, Jr. et al. | 364/522 |
| 5,341,461 | 8/1994 | Kikuchi et al. | 345/420 |
| 5,426,728 | 6/1995 | Matsuo | 345/441 |
| 5,500,926 | 3/1996 | Matsuo et al. | 345/433 |
| 5,511,157 | 4/1996 | Wang . | |
| 5,619,630 | 4/1997 | Minami et al. | 345/433 |
| 5,745,099 | 4/1998 | Blomqvist | 345/145 |
| 5,771,043 | 6/1998 | Nigawara et al. | 345/419 |
| 5,894,310 | 4/1999 | Arsenault et al. | 345/433 |

FOREIGN PATENT DOCUMENTS

| | | |
|---|---|---|
| 0 780 799 A2 | 6/1997 | European Pat. Off. . |
| 2 253 772 | 9/1992 | United Kingdom . |
| 2 292 657 | 2/1996 | United Kingdom . |

OTHER PUBLICATIONS

PCT International Preliminary Examination Report.

*Primary Examiner*—Mark R. Powell
*Assistant Examiner*—Kimbinh T. Nguyen

[57] ABSTRACT

A referencing system and method for determining relative distances and locations of three-dimensional objects displayed on a computer generated display, to enable the objects to be connected or otherwise manipulated relative to one another. The system includes one or more nodes or nodes, which upon activation emits radial vectors in any direction in three-dimensional space from a reference point on the node. The vectors project referencing shapes onto the objects, thereby indicating the relative distances and locations of the objects. In one embodiment of the referencing system of the present invention, a referencing shape becomes smaller as the activated node approaches the object onto which the referencing shape is projected. A perceptive volume surrounds the referencing point of each node, as well as each object or group of objects containing more than one node, such that selecting (for example, with a cursor or computer mouse) an object or group of connected objects outside or within its perceptive volume enables the object or group to be moved with or without rotating the object or group, respectively. Two or more objects can be connected by selecting (for example, with a cursor or computer mouse) a first object or group of connected objects, and dragging the first object or group toward a second object or group of connected objects until the first and second objects or groups of connected objects are within their perceptive volumes, thereby enabling the first and second objects or groups of connected objects to connect at a node situated on the first or second object or group of connected objects.

30 Claims, 9 Drawing Sheets

REFERENCING SYSTEM AND METHOD FOR THREE-DIMENSIONAL OBJECTS DISPLAYED ON A COMPUTER GENERATED DISPLAY

The present invention relates to a modelling and animation system that permits the manipulation of three-dimensional objects displayed on a computer screen.

The present invention comprises a referencing system and method for determining relative distances and locations of three-dimensional objects displayed on a computer generated display, to enable the objects to be connected or otherwise manipulated relative to one another.

One of the major difficulties to overcome when manipulating three-dimensional objects that have been generated on a two-dimensional computer screen is the lack of a sense of depth, that is, determining for example if a particular object is in the foreground or background. When trying to manipulate three-dimensional objects, this question often cannot be answered until the objects actually overlap one another. Joining these objects, in a CAD file for example, thus becomes a tedious trial and error process that frustrates the user. This shortcoming is especially problematic for modelling systems designed for children, who have relatively short attention spans.

While there are a number of systems known in the art for referencing three-dimensional objects displayed on a computer screen, the present invention can be used with particular ease and flexibility. For example, some systems rely on a grid having selected lines or points at regular intervals. Objects must be positioned relative to these preselected locations. Other systems rely on orthogonal views, which surround an object with a cube providing multiple two-dimensional views from each face of the cube. Positioning the object requires repeated viewing and positioning from the top, front and side faces. Other systems rely on absolute and relative x, y and z coordinates. Positioning is achieved by either setting the desired coordinates or moving the objects until the desired coordinates are obtained. Some systems inflexibility require objects to be created at the final set points relative to other objects. Others require an object to be created on the surface of another object, to enable the scaling and positioning to be relative to the other object. Finally, other systems simply rely on a trial and error process, whereby the user continually views and repositions the location of an object relative to other objects. All of these systems require training and, even then, can be tedious, time consuming, and frustrating for the user.

The referencing system of the present invention overcomes the shortcomings of these other systems currently in use by giving the user visual references which allow three-dimensional objects to be assembled easily by both adults and children. The referencing system of the current invention uses none of the methods of the existing systems. Unlike these other systems, the system of the present invention provides a sense of depth and instant and continual feedback as to the location of a selected object relative to other objects. Thus, the system of the present invention provides a simplistic technique requiring no training, making it cost effective.

SUMMARY OF THE INVENTION

The invention provides a referencing system for determining relative distances and locations of three-dimensional objects in an object field that can be displayed on a computer generated display, to enable the objects to be connected or otherwise manipulated relative to one another, which system comprises: a) one or more reference points on the object field; and b) a referencing shape projecting subsystem for projecting from a reference point, upon activation of that reference point, one or more referencing shapes that extend along vectors radiating from the reference point, which referencing shapes extend to other positions of the object field, such referencing shapes thereby indicating relationships between objects in the object field. Preferably, the reference points are activated by an event or input device, such as a graphical pointing device. Preferably, the referencing shapes can project in any direction in a represented three-dimensional space and have attributes that change as the distance between the reference point and the object changes. For example, the size of the referencing shape reduces as the distance between the reference point and the object decreases, and enlarges as this distance increases.

In one embodiment of the invention, the system further comprises: c) a graphical pointing device with a place indicator; d) a first object, which can be a collection of two or more connected objects, having a first reference point and a first perceptive volume surrounding the first reference point; and e) an object moving subsystem for moving the first object by selecting the first object or the first perceptive volume with the graphical pointing device and thereafter moving the place indicator to cause said movement. In a preferred embodiment, f) the object moving subsystem moves an object without rotation by selecting, with the graphical pointing device, a point within the first perceptive volume, and thereafter moving the place indicator to cause said movement. In another preferred embodiment, g) the object moving subsystem moves the first object with rotation about a center of rotation of the first object by selecting, with the graphical pointing device, a point on the object outside any perceptive volume of the first object, and thereafter moving the place indicator to cause said movement and rotation. Preferably, the system has a center of rotation determining subsystem for determining the center of rotation of an object having two or more reference points.

In an embodiment of the invention, the system has: h) an object connecting subsystem for connecting two objects by selecting the first object with the graphical pointing device, moving the first object toward a second object (having a second perceptive volume surrounding a second reference point) by moving the place indicator until the first and second objects are within the first perceptive volume or the second perceptive volume thereby enabling the first and second objects to connect upon activation by an event or input device. Preferably, the system has: i) a connecting priority subsystem for determining which objects will connect when the first object, second object and one or more additional objects are within a perceptive volume surrounding a reference point of the first object, second object or additional objects.

Preferably, the object moving subsystem and the object connecting subsystem can be operated such that, for two or more reference points on separate objects which reference points each have a node, each of those two or more nodes can moved to occupy the same space, thereby enabling more than two objects, or groups of connected objects, to be joined at the same point.

In a preferred embodiment of the invention, the system further comprises: j) a node associated with the first reference point or a second reference point, wherein the second reference point has a second perceptive volume surrounding the second reference point; and k) a node-attribute changing subsystem for changing one or more attributes of the node when the first and second objects are within the perceptive volume of the reference point of the node, where more preferably the attribute that changes is color. Preferably, the node-attribute changing subsystem is further for changing the attributes of the node to their original status upon connection of the first and second objects.

The system can further comprise: l) a disconnecting subsystem for detaching a group of two or more connected objects by selecting the group within a perceptive volume of one of the connected objects and activating the detachment of one or more of those objects with an event or input device. Preferably, the system further comprises: m) a disconnecting priority subsystem for determining which object or group of connected objects will detach when the disconnecting subsystem is activated to disconnect an object or group of objects from a selected group of three or more connected objects.

The invention further provides a method for determining relative distances and locations of three-dimensional objects in an object field that can be displayed on a computer generated display, comprising the steps of: 1) displaying on the display a first object having a first reference point; and 2) displaying referencing shapes projecting from the first reference point, such referencing shapes thereby indicating the relative distances and locations of objects in the object field. Preferably, the attributes of the referencing shapes change as the distance between the reference point and the object changes. Preferably, a first perceptive volume surrounds the first reference point, and the method further comprises: 3) moving the first object by selecting the first object or the first perceptive volume with a graphical pointing device and thereafter moving a place indicator of the graphical pointing device to cause said movement. Preferably, the first object is moved without rotation by selecting, with the graphical pointing device, a point within the first perceptive volume, and thereafter moving the place indicator to cause said movement. Alternatively or supplementally, the first object is moved with rotation about a center of rotation of the first object by selecting, with the graphical pointing device, a point on the object outside any perceptive volume of the first object, and thereafter moving the place indicator to cause said movement and rotation.

The method can further comprise the steps of: 4) selecting the first object with the graphical pointing device; 5) moving the first object toward a second object having a second perceptive volume surrounding a second reference point by moving the place indicator until the first and second objects are within the first perceptive volume or the second perceptive volume; and 6) connecting the first and second objects. Preferably, the method further comprises the step of: 7) determining a priority for connecting objects when the first object, second object and one or more additional objects are within a perceptive volume of either the first object, second object or additional objects.

If a node is associated with the first reference point or a second reference point of a second object, then preferably the second reference point has a second perceptive volume surrounding the second reference point, and the method further comprises: 8) changing the attributes of the node when the first object and second object move such that both are within the perceptive volume of the reference point of the node. Preferably, the method further comprises: 9) changing the attributes to their original status upon connection of the first and second objects.

In a preferred embodiment, the method further comprises the step of: 10) selecting, within a perceptive volume of one of a group of two or more connected objects, the connected objects; and 11) detaching one or more objects from the group. The method preferably further comprising: 12) determining a priority for which object or group of connected objects are detached in said detaching step.

Definitions

The following terms shall have, for the purposes of this application, the meaning set forth below. In particular, for the purpose of interpreting the claims, the term definitions shall control over any assertion of a contrary meaning based on other text found herein:

Attribute
  A feature of a given object, reference point, node or other item, including but not limited to color, texture, transparency, visibility or location.

Center of Rotation
  The center of rotation of an object is a calculated position on an object, which position can be either the location of a reference point or, for instance if an object or group of connected objects has multiple reference points, a center of rotation can be designated such as one of the multiple reference points (such as that nearest to which the object is selected with an input device) or a "center of gravity", which can act as the center of rotation, can be determined corresponding, for example, to a center of gravity for the represented object assuming a constant density.

Event
  An occurrence (for example, the selection of an object, reference point or node or the detection of a second object) that causes a response (for example, the activation of a node, reference point or the change in a node's attributes).

Graphical Pointing Device
  A device for graphically inputting commands by moving a place indicator on a computer screen and, typically, actuating a triggering device when the place indicator is properly placed. Graphical pointing devices include, without limitation, mouse pointing devices, touch pad pointing devices, joystick pointing devices, trackball pointing devices, light pen or other pen-based pointing devices, touch screen pointing devices, eye-tracking or head-tracking pointing devices, and the like.

Object Field
  A universe of objects (really object representations) that can be displayed on a computer display, at least one of which objects can be manipulated. The object field can be larger than the display field of objects actually visible on a display at any given moment.

Perceptive Volume
  An area of volume surrounding each reference point, node object or group of connected objects, which is the sensor for detection for, as relevant under the circumstances, the reference point, node, object or group. Upon detection of an event within the perceptive volume, such as upon the interception of the place indicator of the graphical pointing device, an action or process is executed, often signalled by changes in one or more attributes of the affected node, object or group.

Reference Point
  The focal point for the referencing system of the current invention. It is the point from which vectors are emitted and referencing shapes are projected when the reference point is activated. It is generally the point of attachment and detachment for object surfaces and nodes. Typically, a reference point is associated with a node, as defined below.

Referencing Shape
  A shape projected along a vector emitted from the reference point of an activated nodes. The shape will highlight an object within its vicinity, and can change an attribute, such as size, as the distance between the reference point and the highlighted object changes.
Nodes
  A shape indicated on the display which serves as the visual referencing points for connecting and otherwise manipulating objects relative to one another. Typically, each node has an associated reference point. The nodes are referred to in source code developed to execute the present invention as Vodes™.

BRIEF DESCRIPTION OF THE DRAWINGS

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown. In the drawings:

FIG. 10b is a block diagram representation of the network of connection points for the component objects illustrated in FIG. 10a.

DETAILED DESCRIPTION

Figure 1:
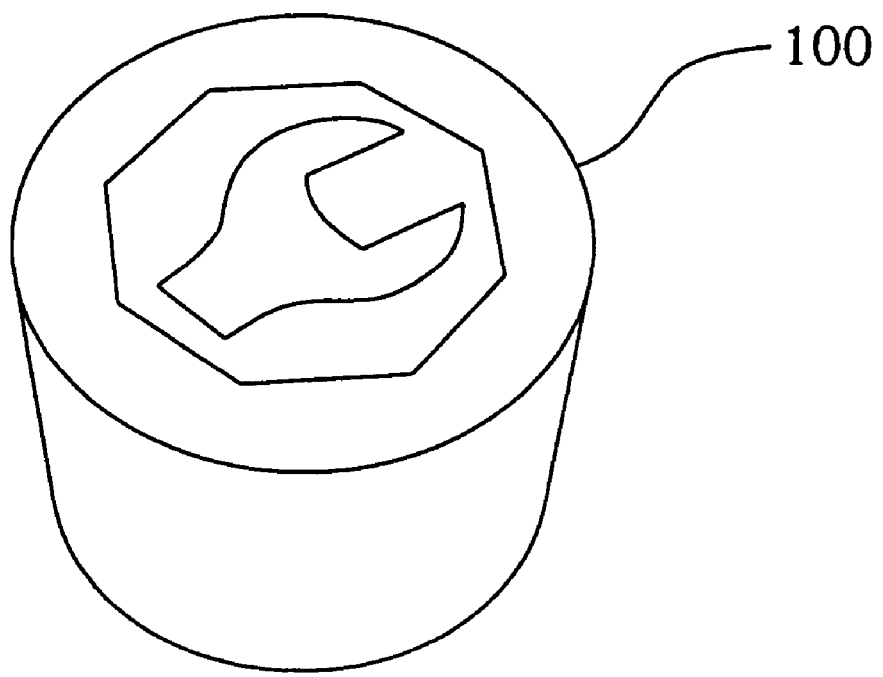
FIG. 1 is a three-dimensional representation of a node as viewed on a two-dimensional computer screen.

Referring to the drawings, wherein the same reference numerals are used to designate the same elements throughout, there is shown in FIG. 1 a representation of a node or "virtual node" 100 of the present invention, which node 100 surrounds a reference point 160 (not shown), in a form suitable for use in a mechanical assembly application for children. For other forms of assembly, node 100 can be represented by other shapes, such as joints for biological assembly, molecules for chemical assembly, bricks for building assembly, rectangles or cubes for architectural assembly, or lines or wires for electronic assembly. Node 100 provides the key connecting mechanism in the referencing system of the present invention by guiding and assisting the manipulation and modelling of three-dimensional objects. The significant features of node 100 include: its ability to provide a reference point for three-dimensional objects, assisting in the location and manipulation of objects in front, behind or around other objects; its ability to "snap to" objects, like a magnet, to assist in connecting objects; its use as a visual cue as to the appropriate attachment of objects to build larger structures and as to the location of reference points; its flexibility in permitting various different structures to be connected; and its ability to provide a software channel for the programming of influences between different objects, thereby providing a logical mechanism for connectivity, in addition to providing a visual reference point for connectivity.

Node 100, as mentioned above, can be represented by any shape, but generally represents no substance or solidity. This attribute allows more than one node 100 to share the same location, which in turn allows more than one group of objects to be connected at the same point. Node 100 can have any color, texture or other visual attribute, including invisibility. The shape of node 100 generally depends on the shape of an associated object and the specific application. Node 100 illustrated in FIG. 1 has the shape of a cylinder. Other specific applications for which the shape of node 100 can be adapted include but are not limited to biological, architectural, mechanical, electronic or dressmaking applications (for example, node 100 could take the shape of a clothing seam).

Figure 2:
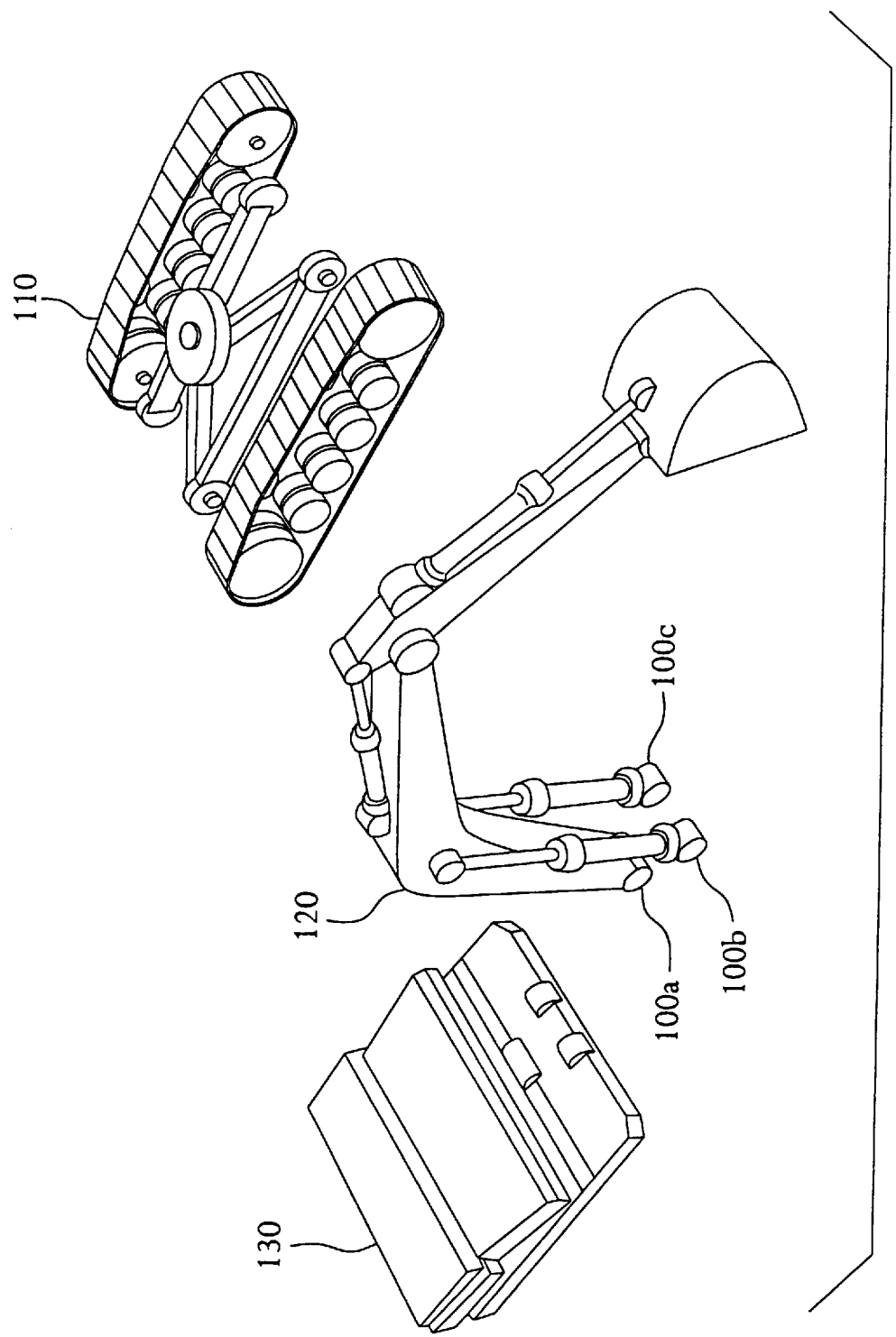
FIG. 2 is a representation of three-dimensional parts as viewed on a two-dimensional computer screen absent the application of the referencing system of the present invention.

FIG. 2 illustrates the difficulty with locating and manipulating three-dimensional objects on a two-dimensional plane, such as a viewing screen. Are tracks 110 floating above arm 120, or are they in the background at the same level as body 130? How far away from body 130 is arm 110? To resolve these issues, the referencing system of the present invention provides feedback on the relative positions and distances of objects. This is achieved through activating the system through nodes For example, arm 110 has three nodes 100a, 100b and 100c at its base. By selecting arm 110 (for example, by clicking and holding on arm 110 with a computer mouse), nodes 100a, 100b and 100c become active and activate the referencing system of the present invention with respect to arm 110.

Figure 3:
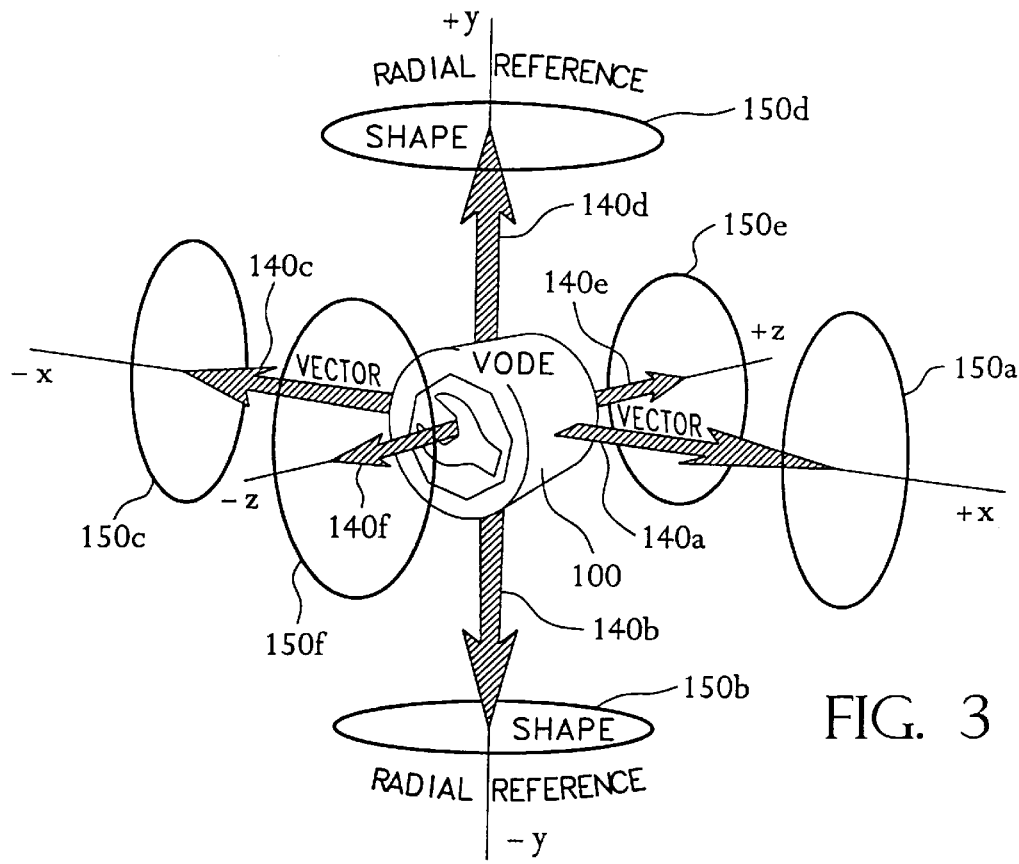
FIG. 3 is a representation of an activated node.

FIG. 3 shows an activated node 100. In a preferred embodiment of the referencing system of the present invention, a node 100 is activated by, for example, clicking a computer mouse button while the cursor is placed within the perceptive volume (not shown) of the node 100 on the computer display screen. A perceptive volume is analogous to a radar range out to which the presence of other objects or nodes or a place indicator of an input device is monitored. Activated node 100 emits radial vectors 140a, 140b, 140c, 140d, 140e and 140f from its reference point, which vectors provide an indication of the distance and location of node 100 relative to other objects. (Here, we refer to the node 100 as the item activated upon. Since the result of activation is the emitting of radial vectors from the associated reference point, one can also conveniently refer to the reference point as the item that is activated.) The vectors can extend in any direction in three-dimensional space, projecting referencing shapes 150a, 150b, 150c, 150d, 150e and 150f into surrounding areas of the object field. For simplicity, FIG. 3 illustrates the vectors as arrows and the referencing shapes as circles. It should be understood that a vector can be represented in any number of ways, including but not limited to a drawn line, a black light or other light beam or a shadow. Similarly, a referencing shape can be symbolized in any number of ways, including but not limited to a light beam, line, shadow, cross hair, square or other symbol, which can be visible or invisible with varying degrees of transparency or color.

Figure 4:
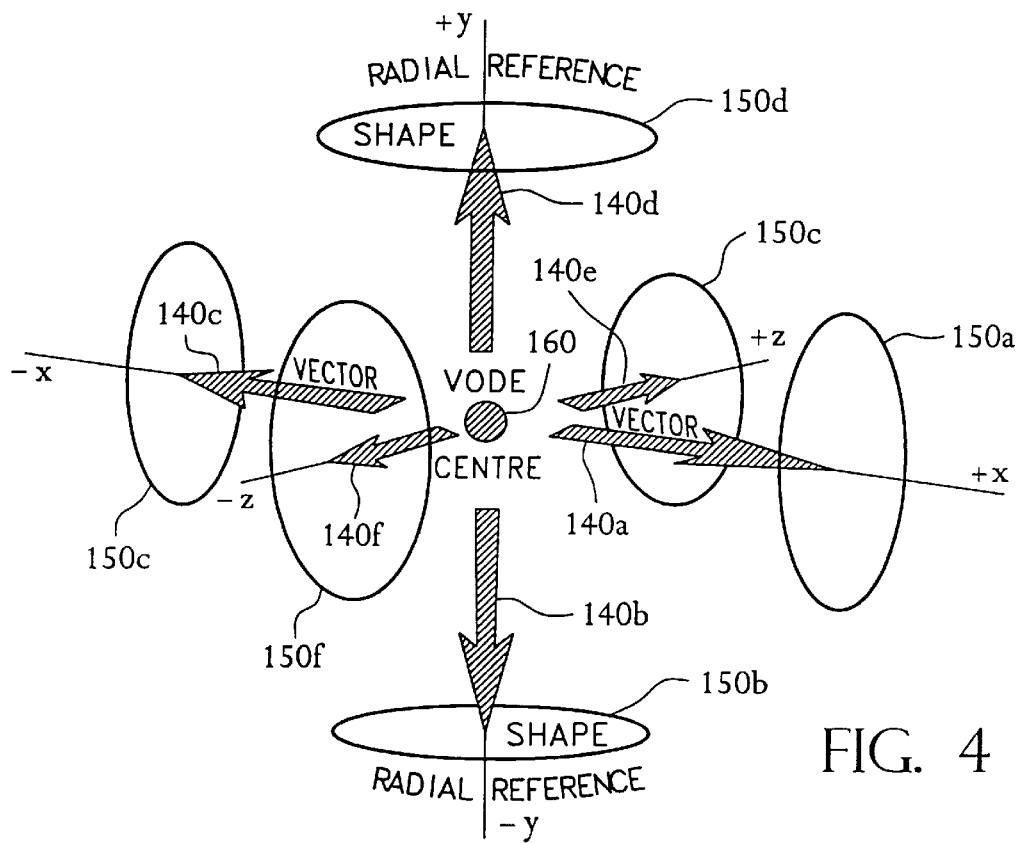
FIG. 4 is a representation of an activated node showing the node reference point rather than the node shape.

FIG. 4 also shows vectors 140a, 140b, 140c, 140d, 140e and 140f projecting referencing shapes 150a, 150b, 150c, 150d, 150e and 150f upon activation of a node 100. Rather than show the shape of node 100, FIG. 4 shows the reference point 160 of node 100. Reference point 160 serves as the focal point for the referencing system of the present invention. It is the point from which vectors are emitted and referencing shapes are projected upon activation of the node. It is also the point of attachment and detachment for other object surfaces and nodes. Reference point 160 can be defined anywhere relative to the shape of node 100.

Figure 5:
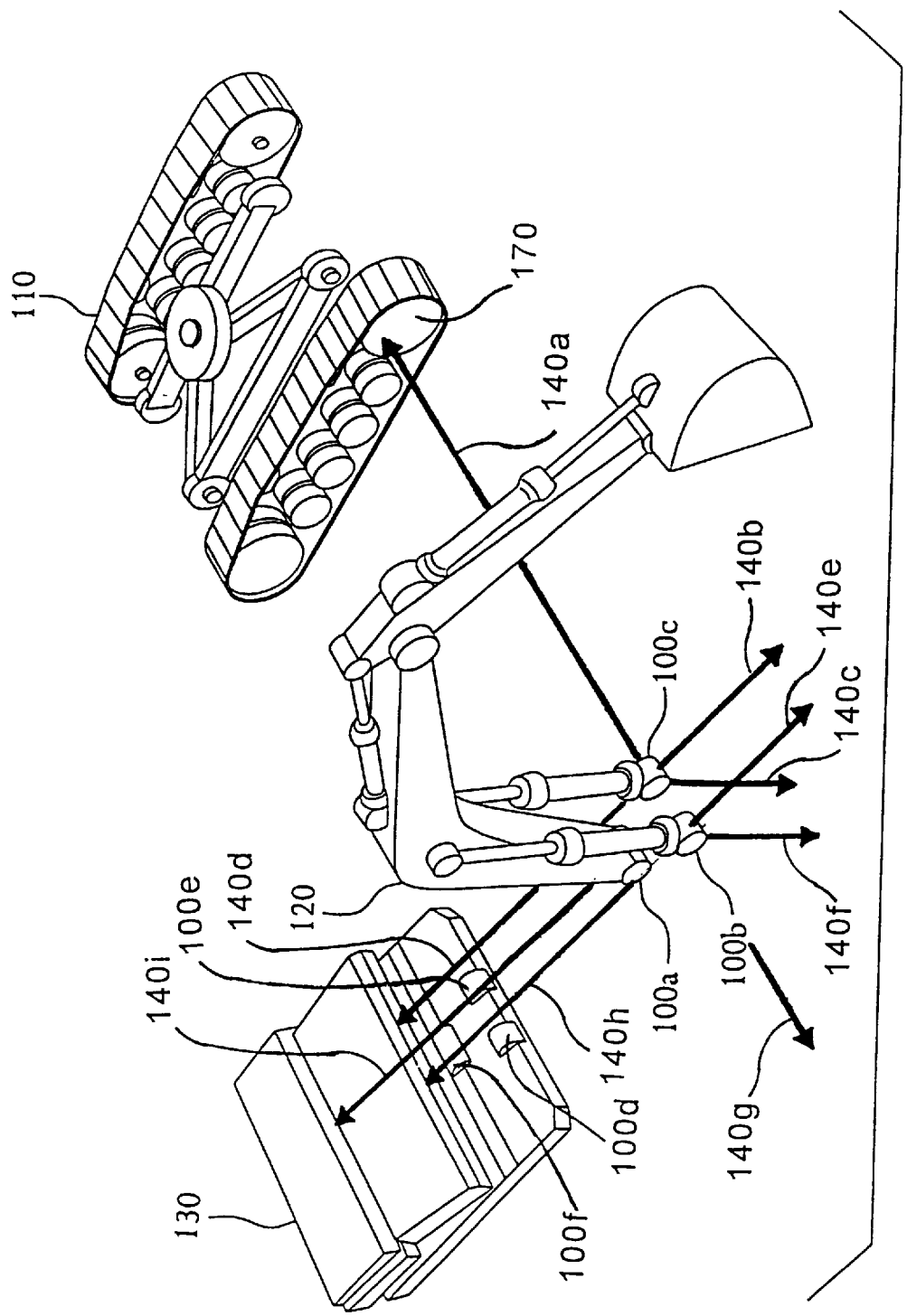
FIG. 5 is a representation of the three-dimensional parts shown in FIG. 2 after having activated the referencing system of the present invention.

FIG. 5 illustrates how the referencing system of the present invention assists in determining the relative distances and locations of three-dimensional objects displayed on a two-dimensional surface. With the activation of nodes 100a, 100b and 100c on the base of arm 120, and the extension of vectors 140a, 140d, 140h and 140i toward tracks 110 and body 130, it can be seen that tracks 110 are in the background and at the same level relative to the base of arm 120. Furthermore, body 130 is in the background and at the same level relative to the base of arm 120. Also, it can be seen that the distance between arm 120 and body 130 is less than the distance between arm 120 and tracks 110, and that the base of body 130 and the tracks 110 are on the same plane. If arm 120 is moved toward body 130, nodes 100a, 100b and 100c on the base of arm 120 will line up with the top of body 130 just above nodes 100d, 100e and 100f located on body 130. If, on the other hand, arm 120 is moved toward tracks 110, nodes 100a, 100b and 100c on the base of arm 120 will be at the same level as the front cog 170 on tracks 110.

Figure 6:
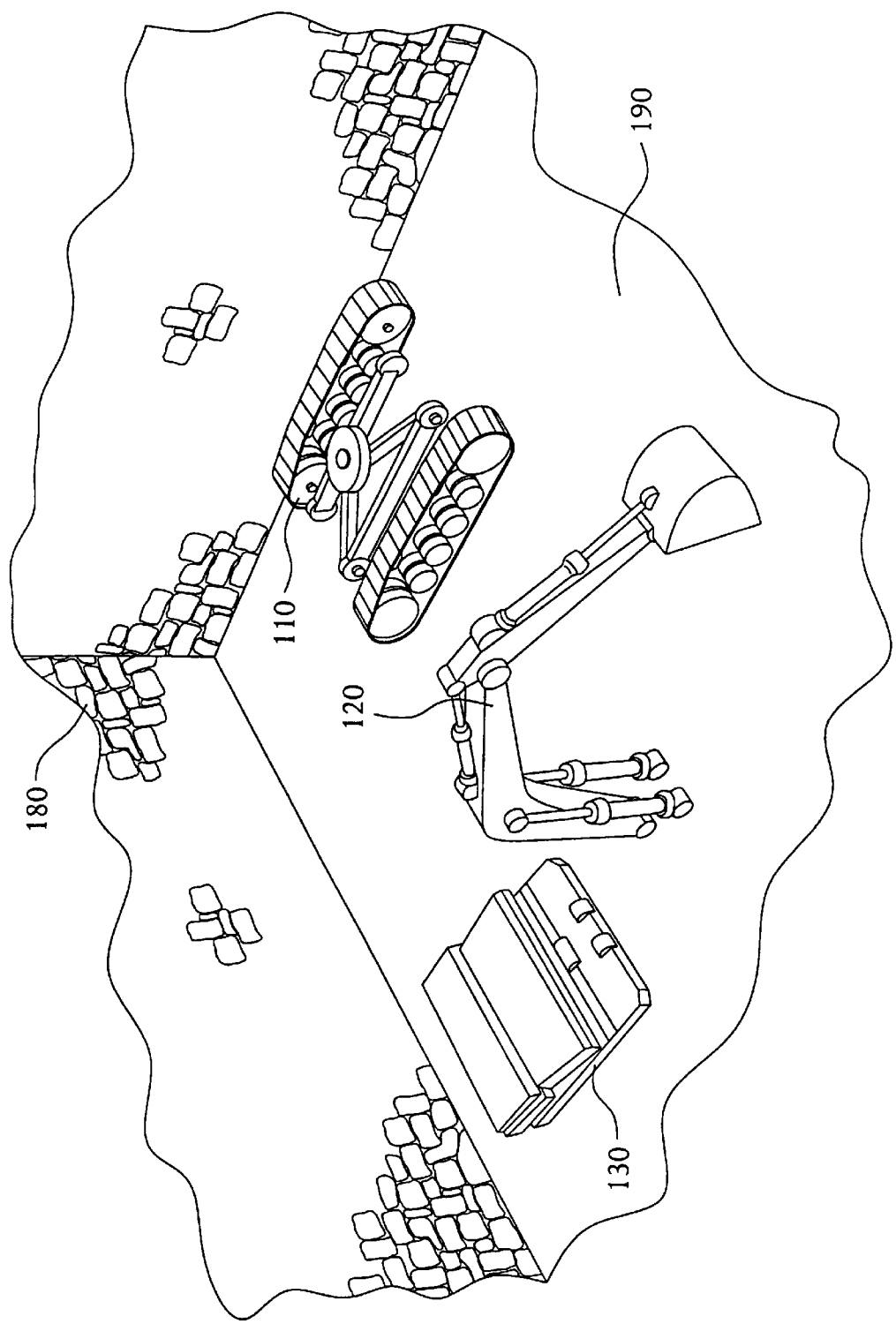
FIG. 6 is a representation of the parts shown in FIGS. 2 and 5 with the addition of background walls and floor.

If walls 180 and floor 190 are added to the display as illustrated in FIG. 6, the referencing of the relative distances and locations of tracks 110, arm 120 and body 130 using the referencing system of the present invention becomes even more obvious and intuitive. In a preferred embodiment of the referencing system of the present invention, the distance between objects affects the size of the projected referencing shapes. For example, if arm 120 is selected and is in motion, referencing shapes (not shown in FIG. 6, but shown as referencing shapes 150a, 150b, 150c, 150d, 150e and 150f projected from node 100 in FIGS. 3 and 4) will move and float across the surface of walls 180, floor 190 and the other objects (tracks 110 and body 130). The size of the projected referencing shapes will continually change as arm 120 moves. In a preferred embodiment of the invention, as objects approach, the size of the projected referencing shapes reduces; as objects separate, the size expands. At the point where two objects meet, the referencing shape reduces to a point. This relationship between the distances separating objects and the size of the projected referencing shapes enables the user of the present invention, including a child user, to more easily and intuitively visualize the three-dimensional arrangement of objects displayed on a two-dimensional computer screen.

Below is an example of sample logic implementing the emission of vectors and projected referencing shapes upon activation of a node. Max Distance refers to the maximum distance from the reference point of a node that the referencing system can extend to, and Divergence is a value representing the rate at which a referencing shape increases in size as it is projected along a vector.

Figure 7:
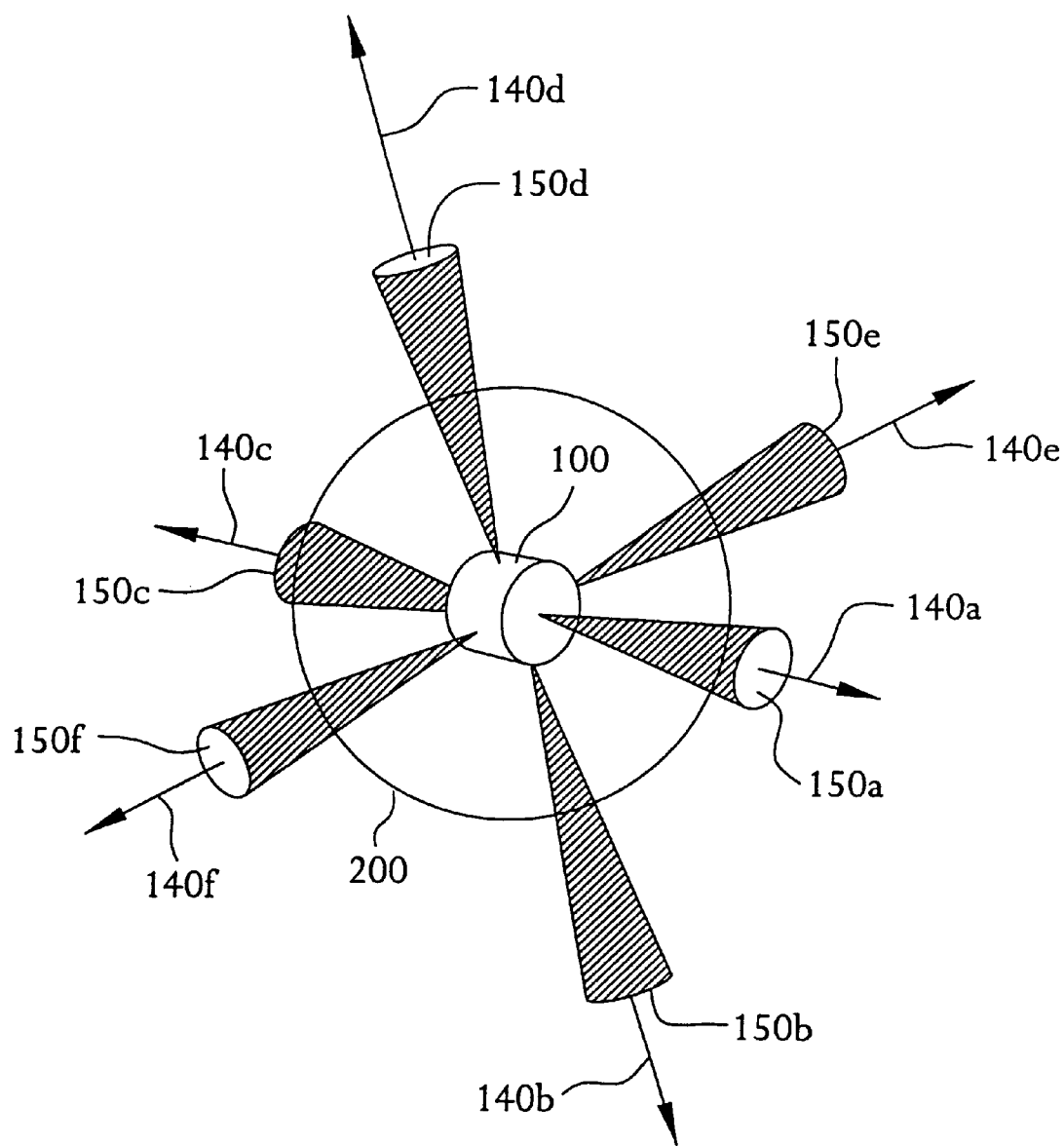
FIG. 7 is a representation of an activated node showing the perceptive volume surrounding the node.

1. Projection of Referencing Shape
   Display referencing object with
   alignment with vector
   length equal to Max Distance
   reference point end shape equal to referencing shape and size equal to zero
   Max Distance shape equal to referencing shape and size equal to Divergence Max Distance
   Set object attributes
   While Referencing Shape Distance not greater than Max Distance or referencing shape intersects with Object
      Set referencing shape size to Divergence Referencing Shape Distance
      Display referencing shape visibility
      Move referencing shape along vector one projection step
      Set Referencing Shape Distance to Referencing Shape Distance+Projection Step
   End
   If Intersection with other Objects
   Display referencing shape on other Object surface End Referring now to FIG. 7, surrounding the reference point of node 100 is a perceptive volume 200. Perceptive volume 200 can be any size or shape and extends outward from node 100, either within or outside the node shape (although it is pictured outside the node shape in FIG. 7). perceptive volume 200 is the sensor that provides detection for node 100. Upon detection of an event within perceptive volume 200, an action or process is executed and changes are made to the attributes of node 100 (such as a change in color or location). An object or group of connected objects having more than one node similarly will have a perceptive volume that is defined by the dimensions of the various perceptive volumes surrounding the individual nodes present on the object or group. In a preferred embodiment of the referencing system of the present invention, an object or group of connected objects can be moved by selecting the object or group (for example, by clicking on the object or group with a cursor or computer mouse) within its perceptive volume and "dragging" the object or group (for example, by moving the cursor with the mouse button still depressed). Selecting the object or group outside its perceptive volume enables the object or group to be moved while rotating around its center of rotation/gravity to follow the path of movement of the object or group.

In a preferred embodiment of the referencing system of the present invention, a first object or group of objects is connected to a second object or group of objects as described herein. The first object or group of objects is selected and moved in the manner described above. One or more nodes on the first object or group of connected objects preferably change color or another attribute to indicate that the second object or group of objects has been detected within the perceptive volume of the first object or group. The projection onto the second object or group of connected objects of referencing shapes from the activated nodes on the first object or group of objects provides continual feedback as to the distance and direction of the second object or group of connected objects. The size of the referencing shapes varies with the distance between the first and second objects or groups. A visual cue (for example, a change in the color or other attribute of the activated nodes on the first object or group) will indicate when the first object or group of connected objects is properly aligned with the second object or group. At this point, upon input of an appropriate event (for example, upon release of the depressed mouse button), the first object or group will change location and connect to the second object or group in a "snap to" fashion typical of a magnet, with the previously activated nodes as connection points. The nodes, now deactivated, will resume their previous color or other attribute.

Detachment of a group of connected objects occurs by selecting the group within its perceptive volume and applying the appropriate input (for example, by selecting an appropriate cursor and clicking on the computer mouse button while the cursor is placed within the perceptive volume of the group).

In a preferred embodiment of the system of the present invention, a priority is assigned to each object located within the perceptive volume of another object or group of connected objects, or forming part of a connected group of objects. This enables the referencing system to determine, for example, which object should connect to a first object when more than one object resides in the first object's perceptive volume. Similarly, it enables the system to determine which objects should detach from a connected group when the group is selected and a command to detach is made. Below are examples of sample logic which employ a priority mechanism when implementing attachment and detachment commands. An attachment count or priority identifies the latest, closest attachment in a group, which generally is the highest priority point of detachment. An attachment list records each of the objects in the group and their priorities.

1. Attachment Example
    If released and Proximity then
    Determine Highest Proximity Object
    Set Object Location to Highest Proximity Object Location
    Determine Object Movement
    Setup Move events for attached Objects.
2. Detachment Example
    If Detach then
    For each attachment in the Object group
        Determine Object
        Determine Attachment Priority
        Determine Object Distance
        Add Object to Attachment List
    End
    Sort Attachment List by Lowest Priority and Distance
    Determine Closest Object with the Lowest Priority Attachment
    Remove attachments The nodes, of the present invention serve not only as visual referencing tools and points of attachment, but also as logical mechanisms which provide software channels for the programming of influences between different objects. Embedded in each node of the present invention are two sets of software controls—a global logic set and a local logic set.

Figure 8:
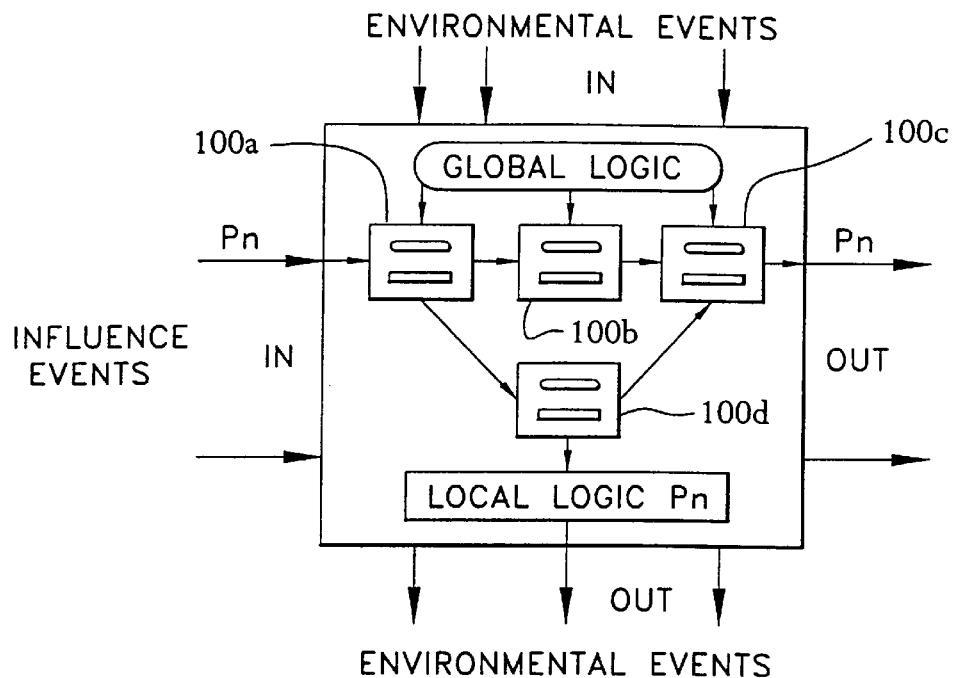
FIG. 8 is a block diagram representation of a network of nodes and their associated global and local logic sets.
Figure 9:
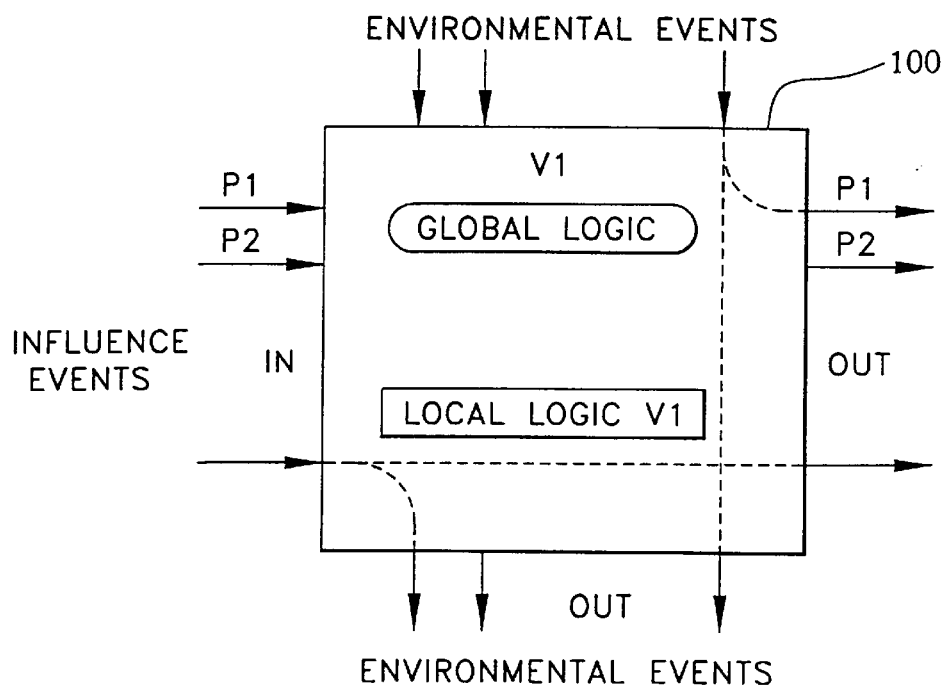
FIG. 9 is an enlarged block diagram representation of a node and its associated global and local logic sets.

FIG. 9 shows a network of nodes 100a, 100b and 100c. Each node has the same set of global logic. Below are examples of applications of programmed global logic:
1. Activation of the Radial Referencing System
    If mouse button clicked event
    {Code}
    If not fully activated
    Activate referencing system
2. Connect Objects
    If mouse button released
    {Code}
    If any nodes within predetermined boundary
    Select closest node
    Connect to selected node 3. Color Change when Passing Over Another Node
    If/While mouse button held
    {Code}
    If another node enters predetermined boundary area
    Determine node's reference
    Add node to determine list
    Send change color environment event to node
    If any nodes in determine list are outside boundary area
    Determine node's reference
    Send reset color environment to node
    Remove node from determine list FIG. 8 shows a single node 100 having both global and local logic sets imbedded therein. Local logic provides rules for a node that are specific to that node. Below is an example of an application of programmed local logic.
1. Remote Control for Base of Body
    If remote control event
    {Code}
    If control is moved left
    Send event rotate 1 degree to body part around node.

A set of global and local logic can be defined for a group of objects and nodes. This enables the monitoring and control for states and exceptions that cannot be detected by the individual objects. For example, logic can be wrapped around a group of connected objects, to accommodate events that cycle around a loop formed by the objects.

Figure 10A:
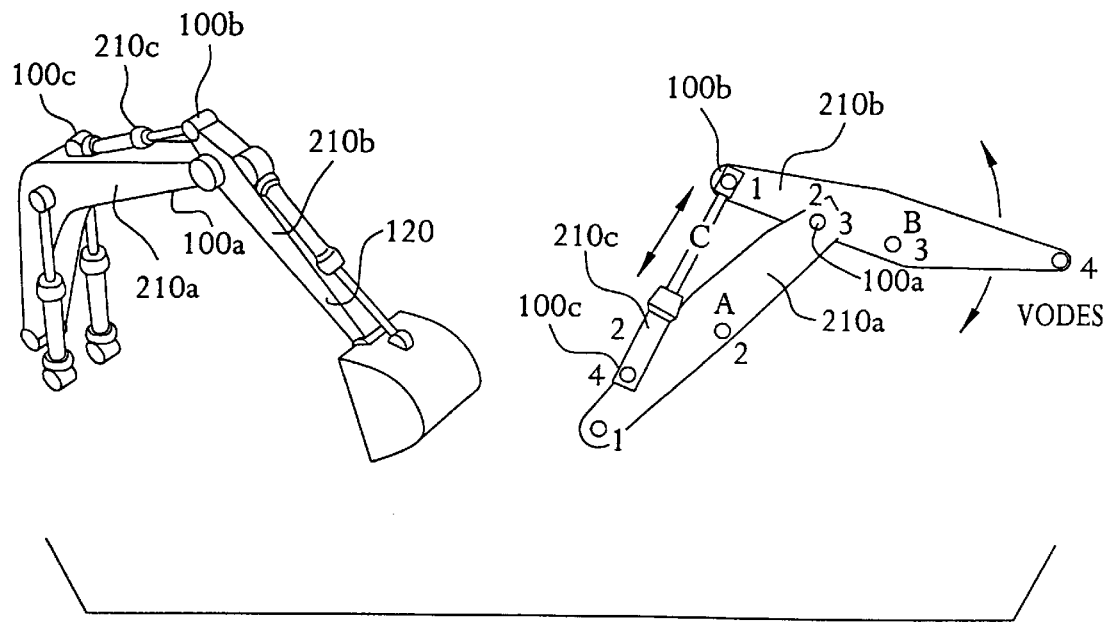
FIG. 10a is a representation of a three-dimensional part as viewed on a two-dimensional computer screen and a corresponding representation of its component objects and their connection points.

FIG. 10a shows a group of objects 210a, 210b and 210c connected at nodes 100a, 100b and 100c to form arm 120. This structure will incorporate loops and influences between the objects in such a way as to enable movement of each object relative to the other two objects as illustrated by the arrows.

Figure 10B:
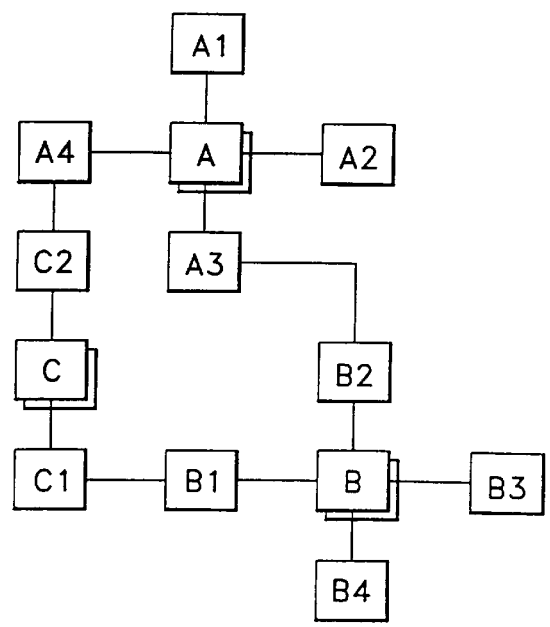

FIG. 10b is a network representation of objects 210a, 210b and 210c, with the letters A, B and C representing objects 210a, 210b and 210c, respectively, and the numbers representing the corresponding nodes pictured in FIG. 10a.

Figure 11:
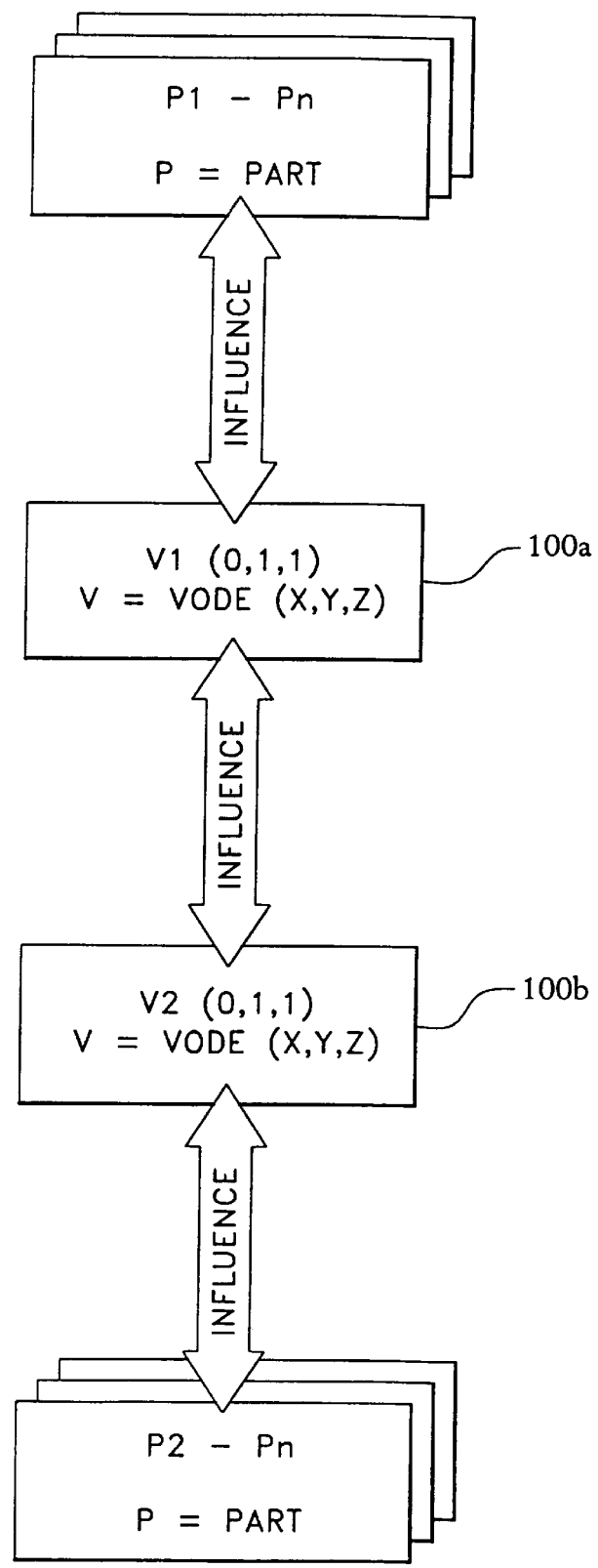
FIG. 11 is a block diagram representation of two nodes that share the same virtual space.

FIG. 11 illustrates how two nodes 100a and 100b can share the same space. Their reference points have the same coordinates in a standard cartesian coordinate system, placing them in the same space. From a logical viewpoint, however, they are separate entities that will be controlled by their own local logic and therefore may respond differently to the same events. Nodes can have different shapes, even though their reference points share the same coordinates. It is the reference point of a node, and not the shape of the node, that serves as the point of connection and detachment for objects.

Below is an example of an application of programmed local logic for changing the attributes of objects due to the proximity or detection of another object within a perceptive volume. The local logic outlined below also establishes priorities that can be used to determine the order in which objects are connected (i.e., joined or attached) should the appropriate input signal be received while multiple objects are within a perceptive volume. If the objects have differing priorities, the highest priority object is preferably joined to the object of the perceptive volume, otherwise, the nearest object is joined. The example is as follows:
    If proximity event is detected
    For each proximity event
        Determine proximate object
        Determine object priority
        Determine object distance
        Add object to proximity list;
    Sort proximity list by priority and distance;
    Copy current attributes to attribute buffer;

Determine highest proximity object;
If highest proximity object is a node, then
    Set current attributes to node proximity attributes;
If highest proximity object is an object, then
    Set current attributes to object proximity attributes;
If proximity event is no longer detected
reset the attributes to the normal state and clear working data files.

While this invention has been described with an emphasis upon preferred embodiments, it will be obvious to those of ordinary skill in the art that variations in the preferred devices and methods may be used and that it is intended that the invention may be practiced otherwise than as specifically described herein. Accordingly, this invention includes all modifications encompassed within the spirit and scope of the invention as defined by the claims that follow.

We claim:

1. A referencing system for determining relative distances and locations of three-dimensional objects in an object field that can be displayed on a computer generated display, to enable the objects to be connected or otherwise manipulated relative to one another, comprising:
    a) one or more reference points for objects found on the object field; and
    b) a referencing shape projecting subsystem for projecting from a reference point, upon activation of that reference point, one or more referencing shapes that extend along vectors radiating from the reference point, which referencing shapes extend to other positions of the object field, such referencing shapes thereby indicating relationships between objects in the object field.

2. The system of claim 1, wherein the reference points are activated by an event or input device.

3. The system of claim 2, wherein the input device is a graphical pointing device.

4. The system of claim 1, wherein the referencing shapes can project in any direction in a represented three-dimensional space.

5. The system of claim 4, wherein the referencing shape projecting subsystem projects referencing shapes with attributes that change as the distance between the reference point and the object changes.

6. The system of claim 5, wherein the cross-section of the referencing shape reduces as the distance from the reference point decreases, and enlarges as this distance increases.

7. The system of claim 4, further comprising:
    c) a graphical pointing device with a place indicator;
    d) a first object, which can be a collection of two or more connected objects, having a first reference point and a first perceptive volume surrounding the first reference point; and
    e) an object moving subsystem for moving the first object by selecting the first object or the first perceptive volume with the graphical pointing device and thereafter moving the place indicator to cause said movement.

8. The system of claim 7, wherein the object moving subsystem moves an object without rotation by selecting, with the graphical pointing device, a point within the first perceptive volume, and thereafter moving the place indicator to cause said movement.

9. The system of claim 7, wherein the object moving subsystem moves the first object with rotation about a center of rotation of the first object by selecting, with the graphical pointing device, a point on the object outside any perceptive volume of the first object, and thereafter moving the place indicator to cause said movement and rotation.

10. The system of claim 9, further comprising:
    f) a center of rotation determining subsystem for determining the center of rotation of an object having two or more reference points.

11. The system of claim 7, further comprising:
    g) a second object having a second perceptive volume surrounding a second reference point;
    h) an object connecting subsystem for connecting two objects by selecting the first object with the graphical pointing device, moving the first object toward the second object by moving the place indicator until the first and second objects are within the first perceptive volume or the second perceptive volume thereby enabling the first and second objects to connect upon activation by an event or input device.

12. The system of claim 11, further comprising:
    i) a connecting priority subsystem for determining which objects will connect when the first object, second object and one or more additional objects are within a perceptive volume surrounding a reference point of the first object, second object or additional objects.

13. The system of claim 7, wherein the object moving subsystem and the object connecting subsystem can be operated such that, for two or more reference points on separate objects which reference points each have a node, each of those two or more nodes can moved to occupy the same space, thereby enabling more than two objects, or groups of connected objects, to be joined at the same point.

14. The system of claim 7, further comprising:
    j) a node associated with the first reference point or a second reference point, wherein the second reference point has a second perceptive volume surrounding the second reference point; and
    k) a node-attribute changing subsystem for changing one or more attributes of the node when the first and second objects are within the perceptive volume of the reference point of the node.

15. The system of claim 14, wherein the attribute that changes is color.

16. The system of claim 14, wherein the node-attribute changing subsystem is further for changing the attributes of the node to their original status upon connection of the first and second objects.

17. The system of claim 7, further comprising:
    l) a disconnecting subsystem for detaching a group of two or more connected objects by selecting the group within a perceptive volume of one of the connected objects and activating the detachment of one or more of those objects with an event or input device.

18. The system of claim 17, further comprising:
    m) a disconnecting priority subsystem for determining which object or group of connected objects will detach when the disconnecting subsystem is activated to disconnect an object or group of objects from a selected group of three or more connected objects.

19. A method for determining relative distances and locations of three-dimensional objects in an object field that can be displayed on a computer generated display, comprising the steps of:
    1) displaying on the display a first object having a first reference point; and
    2) displaying referencing shapes projecting from the first reference point, such referencing shapes thereby indicating the relative distances and locations of objects in the object field.

20. The method of claim 19, wherein the attributes any portion of a referencing shape changes with the distance between the portion and the reference point changes.

21. The method of claim 19, wherein a first perceptive volume surrounds the first reference point, and the method further comprises:

3) moving the first object by selecting the first object or the first perceptive volume with a graphical pointing device and thereafter moving a place indicator of the graphical pointing device to cause said movement.

22. The method of claim 21, wherein the first object is moved without rotation by selecting, with the graphical pointing device, a point within the first perceptive volume, and thereafter moving the place indicator to cause said movement.

23. The method of claim 21, wherein the first object is moved with rotation about a center of rotation of the first object by selecting, with the graphical pointing device, a point on the object outside any perceptive volume of the first object, and thereafter moving the place indicator to cause said movement and rotation.

24. The method of claim 21, further comprising the steps of:

4) selecting the first object with the graphical pointing device;

5) moving the first object toward a second object having a second perceptive volume surrounding a second reference point by moving the place indicator until the first and second objects are within the first perceptive volume or the second perceptive volume; and 6) connecting the first and second objects.

25. The method of claim 24, further comprising the step of:

7) determining a priority for connecting objects when the first object, second object and one or more additional objects are within a perceptive volume of either the first object, second object or additional objects.

26. The method of claim 21, wherein a node is associated with the first reference point or a second reference point of a second object, wherein the second reference point has a second perceptive volume surrounding the second reference point, the method further comprising:

8) changing the attributes of the node when the first object and second object move such that both are within the perceptive volume of the reference point of the node.

27. The method of claim 26, further comprising:

9) changing said attributes to their original status upon connection of the first and second objects.

28. The method of claim 21, further comprising the step of:

10) selecting, within a perceptive volume of one of a group of two or more connected objects, the said connected objects; and 11) detaching one or more objects from the group.

29. The method of claim 28, further comprising:

12) determining a priority for which object or group of connected objects are detached in said detaching step.

30. The method of claim 21, further comprising the step of:

13) moving the first object such that a first node associated with the first reference point occupies the same space as a second node associated with a second reference point of a second object, thereby enabling objects or groups of connected objects to be connected at the same point.

* * * * *